US005924066A

United States Patent [19]
Kundu

[11] Patent Number: 5,924,066
[45] Date of Patent: Jul. 13, 1999

[54] SYSTEM AND METHOD FOR CLASSIFYING A SPEECH SIGNAL

[75] Inventor: Amlan Kundu, Lafayette, Colo.

[73] Assignees: U S WEST, Inc., Denver; MediaOne, Inc., Englewood, both of Colo.

[21] Appl. No.: 08/938,221

[22] Filed: Sep. 26, 1997

[51] Int. Cl.$^6$ .................................................... G10L 5/06
[52] U.S. Cl. ......................... 704/232; 704/234; 704/256
[58] Field of Search ................................. 704/256, 232, 704/254, 249, 242, 239, 240, 245, 234, 231, 246, 250, 251, 255, 236

[56] References Cited

U.S. PATENT DOCUMENTS

| | | | |
|---|---|---|---|
| 5,566,270 | 10/1996 | Albesano et al. | 704/232 |
| 5,579,436 | 11/1996 | Chou et al. | 395/2.53 |
| 5,586,215 | 12/1996 | Stork et al. | 395/2.41 |
| 5,596,679 | 1/1997 | Wang | 704/236 |
| 5,621,857 | 4/1997 | Cole et al. | 395/2.41 |
| 5,749,066 | 5/1998 | Nussbaum | 704/232 |
| 5,758,021 | 5/1998 | Hackbarth | 704/232 |
| 5,787,387 | 7/1998 | Aguilar | 704/208 |

OTHER PUBLICATIONS

"Real–World Speech Recognition With Neural Networks", by Etienne Barnard et al, Center for Spoken Language Understanding, Oregon Graduate Institute, Portland.

"Phoneme Recognition UsingTime–Delay Neural Networks", by Alexander Waibel, et al, IEEE Transactions on Acoustics, Speech & Signal Processing, vol. 37, No. 3, Mar. 1989.

"Links Between Markov Models And Multilayer Perceptrons", by Herve Bourlard, et al, IEEE Transactions On Pattern Analysis & Machine Intelligence, vol. 12, No. 12, Dec.

"A New Connected Word Recognition Algorithm Based on HMM/L VQ Segmentation And LVQ Classification", by Padma Ramesh et al, IEEE 1991, pp. 113–116.

"Competitive Training: A Connectionist Approach To The Discriminative Training Of Hidden Markov Models",by S.J. Young, IEEE Proceedings—I, vol. 138, No. 1, Feb. 1991.

"Global Optimization Of A Neural Network—Hidden Markov Model Hybrid", by Yoshua Bengio et al, IEEE Transactions on Neural Networks, vol. 3, No. 2, Mar. 1992, pp. 252–.

"A Hybrid Segmental Neural Net/Hidden Markov Model System For Continuous Speech Recognition", by G. Zavaliagkos et al, IEEE Transactions On Speech & Audio Processing, vol.

"Transient Sonar Signal Classification Using Hidden Markov Models And Neural Nets," by Amlan Kundu et al, IEEE Journal of Oceanic Engineering, vol. 19, No. 1, Jan.

"An Integrated Hybrid Neural Network And Hidden Markov Model Classifier For Sonar Signal Classification", by Amlan Kundu et al, 1995 IEEE, pp. 3587–3590.

"Neural Networks For Alphabet Recognition", by Mark Fanty et al, Handbook of Neural Computation, 1997, pp. G1.5:1–G1.5:5.

*Primary Examiner*—Richemond Dorvil
*Attorney, Agent, or Firm*—Brooks & Kushman, P.C.

[57] ABSTRACT

A system and method for classifying a speech signal within a likely speech signal class of a plurality of speech signal classes are provided. Stochastic models include a plurality of states having state transitions and output probabilities to generate state sequences which model evolutionary characteristics and durational variability of a speech signal. The method includes extracting a frame sequence, and determining a state sequence for each stochastic model with each state sequence having full state segmentation. Representative frames are determined to provide speech signal time normalization. A likely speech signal class is determined from a neural network having a plurality of inputs receiving the representative frames and a plurality of outputs corresponding to the plurality of speech signal classes. An output signal is generated based on the likely stochastic model.

19 Claims, 3 Drawing Sheets

SYSTEM AND METHOD FOR CLASSIFYING A SPEECH SIGNAL

TECHNICAL FIELD

The present invention relates to systems and methods for classifying speech signals.

BACKGROUND ART

Speech is typically input to a speech recognition system using an analog transducer, such as a microphone, and converted to digital form. Signal pre-processing consists of computing a frame sequence of acoustic feature vectors by processing the speech samples in successive time intervals. In some systems, a clustering technique is used to convert these continuous-valued features to a sequence of discrete code words drawn from a code book of acoustic prototypes. Recognition of an unknown exemplar or speech utterance involves transforming the extracted frame sequence into an appropriate message. The recognition process is typically constrained by a set of acoustic models which correspond to the basic units of speech or speech signal classes employed in the recognizer, a lexicon which defines the vocabulary of the recognizer in terms of these basic units, and a language model which specifies allowable sequences of vocabulary items. The acoustic models, and in some cases the language model and lexicon, are learned from a set of representative training data or training exemplars.

One recognition paradigm frequently employed in speech recognition is the neural network. A neural network is a parallel, distributed information processing structure consisting of processing elements interconnected via unidirectional signal channels called connections. Each processing element may possess a local memory and carry out localized information processing operations. Each processing element has many inputs and a single output that fans out into as many co-lateral connections as desired. The inputs to a processing element have a connection weight. The process of learning a given task by a neural network, such as recognizing a frame sequence to classify a speech signal, is the weight adaptation in which a connection weight changes as a non-linear function of the current connection weight, the internal excitation state of the neuron, and the current input to the neuron at that connection. The output of the neuron is a non-linear function of its internal excitation, such as the sigmoid function.

Many neural net architectures can be trained for strong interclass discriminative properties.

However, neural networks often lack the time normalization characteristics desired for speech signal processing. Because of speaker variability, different exemplars from the same speech signal class may vary in temporal scale. Time dilations and compressions among exemplars of the same class greatly reduce the reliability of the neural network due to the neural network's lack of time normalization characteristics.

Time-delay neural network architectures, which are somewhat capable of time normalization, do exist. However, time-delay neural network architectures are very complex, and have not found wide acceptance in the art of speech recognition. Thus, using a time-delay neural network for speech recognition is not very practical.

Another recognition paradigm frequently employed in speech recognition is the hidden Markov model. Hidden Markov modeling is a probabilistic pattern matching technique which is more robust than neural networks at modeling durational and acoustic variability among exemplars of a speech signal class. A hidden Markov model is a stochastic model which uses state transition and output probabilities to generate state sequences. Hidden Markov models represent speech as a sequence of states, which are assumed to model frames of speech with roughly stationary acoustic features. Each state is characterized by an output probability distribution which models acoustic variability in the spectral features or observations associated with that state. Transition probabilities between states model evolutionary characteristics and durational variabilities in the speech signal. The probabilities, or parameters, of a hidden Markov model are trained using frames extracted from a representative sample of speech data. Recognition of an unknown exemplar is based on the probability that the exemplar was generated by the hidden Markov model.

One hidden Markov model based speech recognition technique involves determining an optimal state sequence through a hidden Markov model to represent an exemplar, using the Viterbi algorithm. The optimal state sequence is defined as the state sequence which maximizes the probability of the given exemplar in a particular hidden Markov model. During speech recognition, an optimal state sequence is determined for each of a plurality of hidden Markov models. Each hidden Markov model represents a particular speech signal class of the speech recognition system vocabulary. A likely hidden Markov model is selected from the plurality of hidden Markov models to determine the likely speech signal class.

Training hidden Markov model based recognizers involves estimating the parameters for the word models used in the system. Parameters for the models are chosen based on a maximum likelihood criteria. That is, the parameters maximize the likelihood of the training data being produced by the model. This maximization is performed using the Baum-Welch algorithm, a re-estimation technique based on first aligning the training data with the current models, and then updating the parameters of the models based on this alignment. Because the hidden Markov models are trained on a class-by-class basis, interclass distinction may be rather poor.

Attempts have been made to train all classes simultaneously based on maximum mutual information criteria. However, mathematical manipulations are complicated, algorithms are not very practical, and many assumptions must be made. Thus, training hidden Markov models for strong interclass distinction is not very practical.

SUMMARY OF THE INVENTION

It is, therefore, an object of the present invention is to provide a system and method for classifying a speech signal having robust time normalization characteristics and strong interclass distinction.

In carrying out the above object and other objects and features of the present invention, a system and method for classifying a speech signal are provided. In a method of classifying a speech signal within a likely speech signal class, a plurality of speech signal classes correspond to a plurality of stochastic models. Each stochastic model includes a plurality of states having state transition and output probabilities to generate state sequences which model evolutionary characteristics and durational variabilities of the speech signal. The method comprises extracting a frame sequence from the speech signal, and determining a state sequence for each stochastic model. Each state sequence corresponds to the frame sequence and has full state segmentation. Each state of the sequence corresponds to at least one frame of the frame sequence. A likely stochastic model of the plurality of stochastic models is determined based on the state transition and output probabilities associated with the state sequences.

Representative frames for the state sequence of the likely stochastic model are determined to provide speech signal time normalization. A likely speech signal class is determined from a neural network having a plurality of inputs receiving the representative frames, and a plurality of outputs corresponding to the plurality of speech signal classes. An output signal is generated based on the likely speech signal class, and preferably further based on the likely stochastic model.

In a preferred embodiment, the stochastic models are first order hidden Markov models having left-to-right topology. Determining a state sequence for each stochastic model further comprises determining an optimal state sequence corresponding to the frame sequence; and when the optimal state sequence does not have full state segmentation, determining sub-optimal state sequences corresponding to the frame sequence, until a state sequence having full state segmentation is determined.

Further, in a preferred embodiment, in addition to determining representative frames for each state of the state sequence of the likely stochastic model, additional representative frames are determined for at least one state based on the durational variability of the speech signal to preserve variabilities within the speech signal while normalizing dilations and compressions of the signal as a whole.

Preferably, the neural network comprises a plurality of neural networks. Each neural network is configured based on a corresponding pair of the stochastic models for interclass distinction between a corresponding pair of speech signal classes.

Further, in carrying out the present invention, a system for classifying a speech signal is provided. The system comprises stochastic model logic, frame logic, segmentation logic, model selection logic, time normalization logic, a neural network, and output logic.

The advantages accruing to the present invention are numerous. For example, the stochastic models provide robust time normalization properties while the neural network provides strong interclass distinction.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2b is a graph depicting the state labeling of a time dilated speech signal containing the same information as the speech signal depicted in FIG. 2a;

BEST MODE FOR CARRYING OUT THE INVENTION

Figure 1:
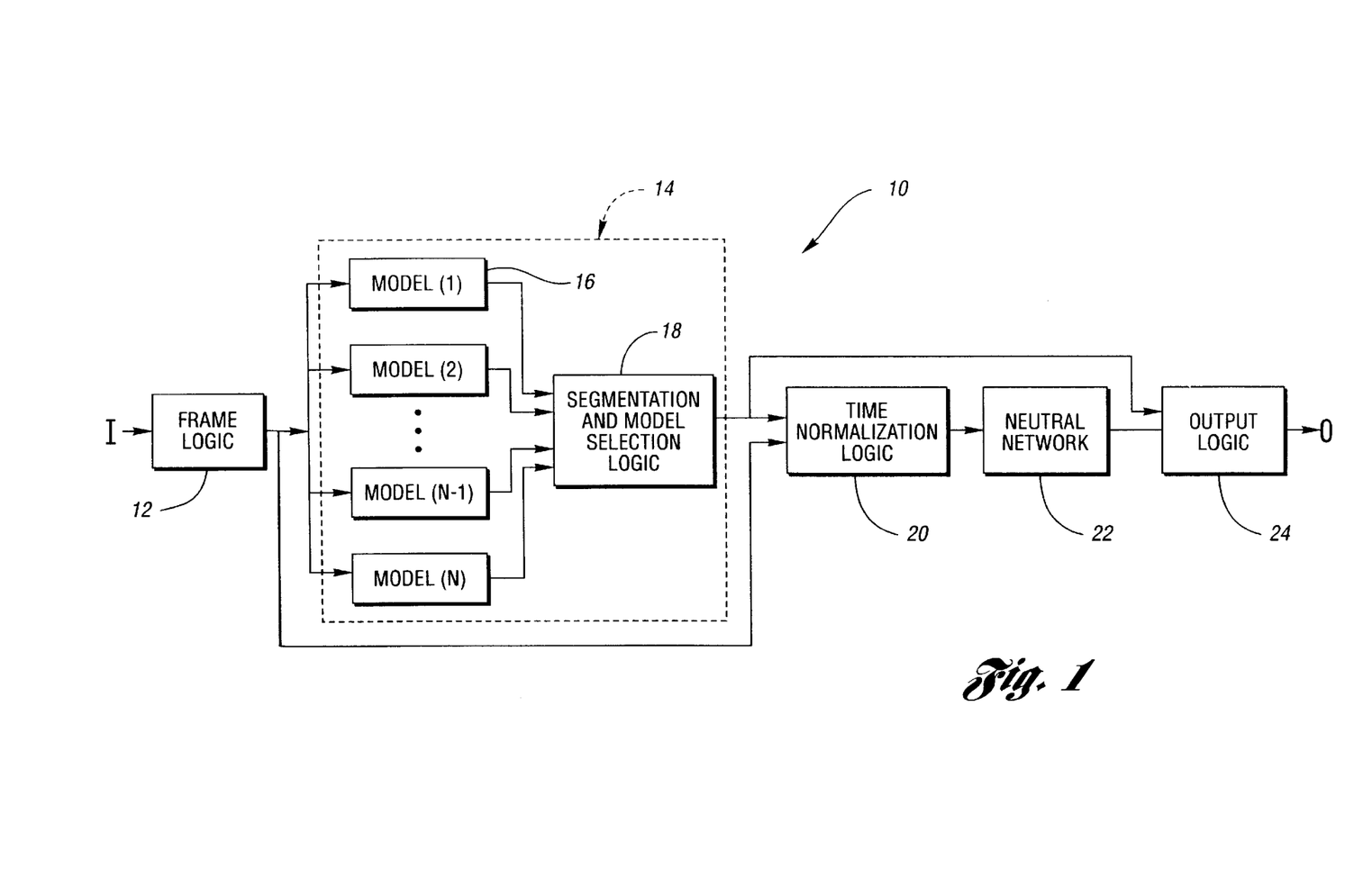
FIG. 1 is a block diagram illustrating a system of the present invention for classifying a speech signal.

With reference to FIG. 1, a system of the present invention is generally indicated at 10. Frame logic 12 extracts spectral features from an input signal designated by I. A preliminary classifier 14 includes stochastic model logic 16 which represents a plurality of stochastic models. Segmentation and model selection logic are indicated at block 18. A dynamic programming algorithm is used to achieve full state segmentation for each stochastic model 16, and to select a likely stochastic model as a preliminary classifier. Time normalization logic 20 determines representative frames for the state sequence of the likely stochastic model to provide speech signal time normalization. A neural network 22 determines a likely speech signal class. The neural network has a plurality of inputs receiving the representative frames, and a plurality of outputs corresponding to the plurality of speech signal classes. Output logic 24 generates an output signal, designated by O, indicative of the likely speech signal class or indicative of a "not classified" speech signal.

The system 10 will now be described in detail. Feature extraction, at frame logic 12, involves computing sequences of numeric measurements, or feature vectors, which typically approximate the envelope of the speech spectrum. Spectral features can be extracted directly from the Discrete Fourier Transform (DFT) or computed using Linear Predictive Coding (LPC) techniques. Cepstral analysis can also be used to deconvolve the spectral envelope and the periodic voicing source. Each feature vector is computed from frame speech data defined by windowing samples of the signals. While a better spectral estimate can be obtained using more samples, the interval must be short enough so that the windowed signal is roughly stationary.

For speech data, the number of samples is chosen such that the length of the interval covered by the window is approximately 25–30 milliseconds. The feature vectors are typically computed at a frame rate of 10–20 milliseconds by shifting the window forward in time. Tapered windowing functions, such as the Hamming window, are used to reduce dependence of the spectral is estimate on the exact temporal position of the window. Spectral features are often augmented with a measure of the short time energy of the signal, as well as with measures of energy and spectral change over time. In one embodiment, 25.6 millisecond windows are used with a frame rate of about one-half of the window length to provide a 50% overlap of consecutive frames.

Each stochastic model 16 includes a plurality of states having state transition and output probabilities to generate state sequences which model evolutionary characteristics and durational variabilities of the speech signal. One such stochastic model is the hidden Markov model.

A hidden Markov model is a doubly stochastic process with an underlying Markov process that is not observable (the states are hidden), but can only be observed through another set of stochastic processes which are produced by the Markov process (the observations or outputs are probabilistic functions of the states). A sequence of observation $O=\{O_l, \ldots, O_T\}$ is produced by a Markov state sequence $Q=\{q_l, \ldots, q_T\}$ where each observation $o_t$ is from the set of X observation symbols $V=\{v_k; 1\leq k\leq X\}$ and each state $q_t$ is from the set of Y states $S=\{S_i; 1\leq i\leq Y\}$. Thus, a hidden Markov model can be characterized by:

$\Pi=\{\pi_i\}$, where $\pi_i=P(q_1=s_i)$ is the initial state probability;

$A=\{a_{ij}\}$, where $a_{ij}=P(q_{t+1}=s_j|q_t=s_i)$ is the state transition probability;

$\Gamma=\{\gamma_j\}$, where $\gamma_j=P(q_T=s_j)$ is the last state probability;

$B=\{b_i(k)\}$, where $b_i(k)=P(o_t=v_k|q_t=i)$ is the symbol probability; (1)

and satisfies the probability constraints:

$$\sum_{i=1}^{Y} \pi_i = 1; \sum_{j=1}^{Y} a_{ij} = 1 \ \forall \ i; \sum_{j=1}^{Y} \gamma_j = 1; \sum_{k=1}^{X} b_i(k) = 1 \ \forall \ i. \quad (2)$$

Note here that the last state probability Γ is included in this definition. In a Markov state sequence, the last state probability models the different probable final states as the initial state probability does for the initial states. A hidden Markov model is denoted by a compact notation λ={π,A,Γ,B}.

The training algorithm for a hidden Markov model is iterative. One salient characteristic of this algorithm is that if a particular state transition probability is initialized to zero during training, that probability will remain zero during the entire training procedure. As a result, a structure can be imposed on the state transition matrix. In left-to-right hidden Markov models, the observation sequence starts from state 1. From state 1, there are two probable transitions: self-transition to state 1 or transition to state 2; and so on. Preferably, embodiments of the present invention do not allow a skip in state. That is, all the elements in our initial state transition matrix except those on the main diagonal and the upper principal off-diagonal are preferably zero. Because the two probabilities in each row should sum up to one, both these probabilities are selected as 0.5 for initialization.

The initial observation probabilities are selected as follows. Some of the training sequences are selected at random, and they are randomly segmented in a left-to-right fashion. From this segmentation, all the frames belonging to same state are used to compute multidimensional means, covariance matrices and mixture coefficients of the Gaussian sum observation probability in each state. This initialization procedure is repeated a number of times by exploiting the randomness in the initial observation probability computation. For each class, each initialization procedure leads to one model. The best model, in the sense of modified Viterbi scoring as will be described, is selected as the optimum model for that class.

These estimated parameters are then used as the initial parameters for the Baum-Welch re-estimation algorithm.

Figure 2A:
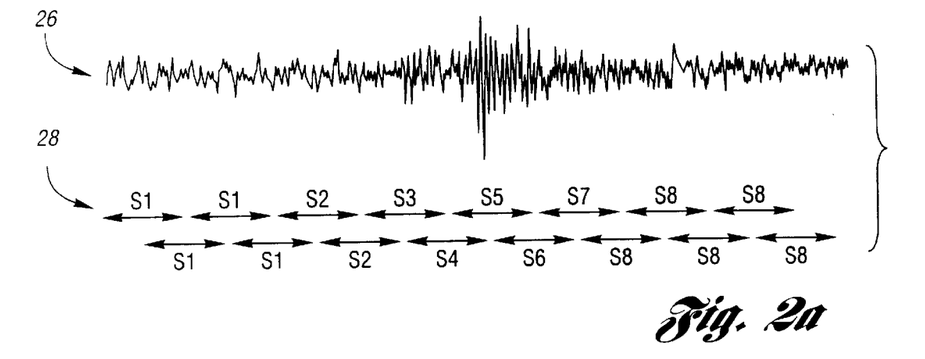
FIG. 2a is a graph depicting the state labeling of an information containing speech signal.

At segmentation and model selection logic 18, full state segmentation of each model 16, and model selection occur. With reference to FIG. 2a, a speech signal is seen as a succession of acoustic events and is generally indicated at 26. For example, the speech signal 26 is broken into eight successive events $s_1$ through $s_8$. Here, si is the background ocean noise; $s_2$ and $s_3$ are the events that depict the transition to frequency-rich mid portion of the speech signal; $s_4$, $s_5$ and $s_6$ are the events depicting the various stages of the speech signal while $s_7$ and $s_8$ show the gradual demise of the speech signal. All frames of the sequence are generally indicated at 28. Frames that correspond to one event have the same state label, as shown. Each event roughly corresponds to one state of the hidden Markov model. To preserve the time progression of the events, left-to-right hidden Markov model topology, i.e. state "1" is followed by state "1" or state "2", state "2" is followed by state "2" or state "3", etc. is preferably employed. Thus, any speech signal is segmented into a fixed number of states (with full state segmentation) even though the speech signal could stretch over many numbers of frames.

Figure 2B:
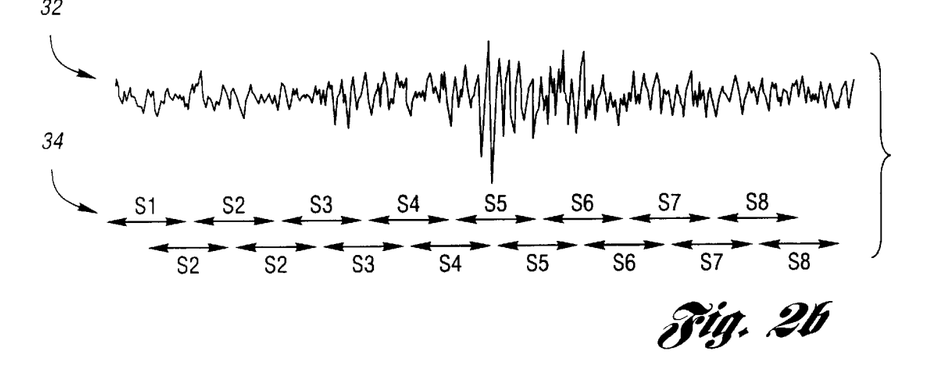

With reference to FIG. 2b, a time dilated speech signal is generally indicated at 32. Time dilated speech signal 32 contains the same information as speech signal 26 depicted in FIG. 2a. The frame sequence of speech signal 32 is generally indicated at 34. Both speech signals are recognized by the hidden Markov models due to the hidden Markov model's ability to model signal durational variability, that is, model a dilated or compressed signal.

The full state segmentation is preferably achieved by a modified Viterbi algorithm. Achieving full state segmentation is essential for embodiments of the present invention. The straightforward application of the traditional Viterbi algorithm may not achieve full state segmentation in many situations. The Viterbi algorithm searches for the globally optimal state sequence. Often the globally second best or the globally third best etc. is the first sequence having full state segmentation.

The objective of the modified Viterbi algorithm is to find these sub-optimal sequences. There are two approaches: parallel approach and serial approach. In the parallel approach, the trellis structure of the Viterbi algorithm is extended to a third dimension, the dimension of choice. Thus, all nodes in the second choice plane represent the globally second best cost, e.g., maximum likelihood probability, to reach that node and the transition from the previous layer. Similarly, all nodes in the third choice plane represent globally third best cost to reach that node and the transition from the previous layer; and so on.

To track the globally optimal state sequence, all terminal nodes in the first plane (choice 1) are used. The node that has the highest probability (or the lowest cost) is selected as the terminal state, and is used for retracting the state sequence. To track the globally second best state sequence, the terminal node used to find the globally optimal state sequence is excluded. All terminal nodes in the first and second planes are used to track the globally second best state sequence. This idea is extended to track the globally third choice and so on until a full state segmentation is reached.

The algorithm using the parallel approach is compactly written as:

Step 0: Storage t=time index;

$\psi_t(i,l)$, $1 \leq t \leq T, 1 \leq i \leq N, 1 \leq l \leq L$=survivor terminating in state i at time t with choice l;

$\delta_t(i,l)$, $1 \leq t \leq T, 1 \leq i \leq N, 1 \leq l \leq L$=Maximum probability at state i at time t with choice l.

Note that $\psi_t(i,l)$ is a three-dimensional array, and each element of this array stores a two-dimensional data. $\delta_t(i,l)$ is a three-dimensional array, and each element of this array stores a one-dimensional data.

Step 1: Initialization $\delta_t(i,1) = \pi_i b_i(O_1)$ for $1 \leq i \leq N$ $\delta_1(i,l) = 0$ for $1 \leq i \leq N, 2 \leq l \leq L$ $\psi_t(i,l) = (0,0)$ for $1 \leq i \leq N, 1 \leq l \leq L$ Step 2: Recursion For $2 \leq t \leq T, 1 \leq j \leq N, 1 \leq l \leq L$; compute $\delta_t(j,l)$ and $\psi_t(j,l)$.

$$\delta_t(j, l) = (l - th) \max_{1 \leq i \leq N, 1 \leq m \leq l} [\delta_{t-1}(i, m) a_{ij}] b_j(o_t) \quad (3)$$

$$\Psi_t(j, l) = (i^*, m^*) = \arg(l - th) \max_{1 \leq i \leq N, 1 \leq m \leq l} [\delta_{t-1}(i, m) a_{ij}] \quad (4)$$

where (c-th) max[·] denotes the c-th maximum.

Step 3: Termination

For $1 \leq j \leq N, 1 \leq l \leq L$ $$P^*(l) = (l - th) \max_{1 \leq i \leq N, 1 \leq m \leq l} [\delta_T(i, m)] \quad (5)$$

-continued $$(i_T^*, l_T^*) = \arg(l - th) \max_{1 \le i \le N, 1 \le m \le l} [\delta_T(i, m)] \qquad (6)$$

Step 4: Back-tracking
For t=T−1, T−2, . . . , 1; and P*(l), 1≦l≦L;

$$(i^*_t, l^*_t) = \Psi_{t+1}(i^*_{t+1}, l^*_{t+1}). \qquad (7)$$

In the serial version of the modified Viterbi algorithm, all nodes traced by the globally optimal state sequence are updated for the second best cost and its associated transition. This is used to find the globally second best state sequence. The nodes in the second best state sequence are updated for the next best cost and its associated transition, and so on.

The algorithm using the serial approach is compactly written as:

Step 0: Storage
 t=time index
 c=iteration index
 $\psi_t(i,l)$, $1 \le t \le T, 1 \le i \le N, 1 \le l \le L$=survivor terminating in $i_t$
 $\delta_t(i,l)$ $1 \le t \le T, 1 \le i \le N, 1 \le l \le L$=survivor score in $i_t$ count
  $(i,t), 1 \le i \le N, 1 \le t \le T$=count of passes allowed at node $i_t$ Step 1: Initialization
 $\delta_1(i,1) = \pi_i b_i(O_1)$ for $1 \le i \le N$
 $\delta_t(i,l) = 0$ for $1 \le i \le N, 2 \le l \le L$ $$\Psi_1(i, l) = 0 \quad \text{for } 1 \le i \le N, 1 \le l \le L$$

$$\text{count}(i, t) = 1 \quad \text{for } 1 \le i \le N, 1 \le t \le T$$

$$c = 1$$

Step 2: Pre-Recursion
 for 2≦t≦T,1≦j≦N $$\delta_t(j, 1) = \max_{1 \le i \le N} [\delta_{t-1}(i, 1) a_{ij}] b_j(o_t)$$

$$\Psi_t(j, 1) = \arg\max_{1 \le i \le N} [\delta_{t-1}(i, 1) a_{ij}]$$

Step 3: Backtracking $$P^* = (c - th) \max_{1 \le i \le N, 1 \le l \le \text{count}(i,T)} [\delta_T(i, l)\gamma_i]$$

$$(i_T^*, l_T^*) = \arg(c - th) \max_{1 \le i \le N, 1 \le l \le \text{count}(i,T)} [\delta_T(i, l)\gamma_i]$$

$$\text{count}(i_T^*, T) = \text{count}(i_T^*, T) + 1$$

where (c-th) max[·] denotes the c-th maximum. for t=T−1, T−2, . . . , 1

$$(i_t^*, l_t^*) = \Psi_{t+1}(i_{t+1}^*, l_{t+1}^*)$$

$$\text{count}(i_t^*, t) = \text{count}(i_t^*, t) + 1$$

If $I^* = \{i^*_1 i^*_2 \ldots i^*_T\}$, the c-th optional state sequence, satisfies the given criteria or c exceeds limit, exit; otherwise, continue;

Step 4: Forward-tracking
 for t=2,3, . . . ,T $$\delta_t(j_t^*, l) = (l - th) \max_{1 \le i \le N, 1 \le m \le \text{count}(i,t-1)} [\delta_{t-1}(i, m) a_{ij_t^*}] b_{j_t^*}(o_t)$$

-continued $$\Psi_t(j_t^*, l) = \arg(l - th) \max_{1 \le i \le N, 1 \le m \le \text{count}(i,t-1)} [\delta_{t-1}(i, m) a_{ij_t^*}]$$

increase c by 1; repeat Step 3.

It is to be appreciated that selection of the appropriate implementation of the modified Viterbi algorithm is dependent on the architecture employed in stochastic model logic 16, segmentation and model selection logic 18, and on the number of states in the hidden Markov models. Further, it is to be appreciated that other methods of achieving full state segmentation may be employed as desired; however, the modified Viterbi algorithm is the preferred method.

After determination of a fully segmented state sequence for each of the models 16, a likely stochastic model is determined based on the state transition and output probabilities associated with the state sequences. For each stochastic model, the probability that the frame sequence was produced by that stochastic model is determined. Based on these probabilities, the stochastic model having the highest probability, with full state segmentation, is selected as the likely stochastic model.

Time normalization logic 20 determines representative frames for the state sequence of the likely stochastic model to provide speech signal time normalization. That is, after full state segmentation, all of the successive frames that have the same state label, as shown in FIGS. 2a and 2b, are represented by one average or representative frame. For example, all frames corresponding to state 1 will be replaced by a single average frame representing state 1. All of the frames corresponding to state 2 will be replaced by a single average frame representing state 2; and so on. As a result, all speech signals, irrespective of temporal scale, are now represented by a fixed number of frames suitable for classification by the neural network 22.

In other words, time normalization logic 20 removes any time dilation or compression from the speech signal. For example, the speech signals illustrated in FIGS. 2a and 2b will have identical representative frames after processing by time normalization logic 20.

In a preferred embodiment, the states that have much higher durational probability relative to each other are assigned extra representative frames. Some states are more prevalent than others when an exemplar is labeled by its states using the modified Viterbi algorithm. Extra frames are proportionally assigned to states with higher duration occurrences. This allows time normalization logic 20 to remove any time dilation or compression of the speech signal as a whole, while preserving the evolutionary characteristics and durational variabilities within the speech signal.

For example, in a hidden Markov model having seven states, six of the seven states may have ten frames per state after state labeling. The remaining state may have about twenty frames. Time normalization logic 20 assigns a representative frame to each state. Then, time normalization logic 20 assigns an extra frame to the state that had the twenty frames. In this manner, the signal is time normalized while preserving the evolutionary characteristics and durational variability that is within the signal by assigning a total of eight representative frames: one frame for each of seven states plus one extra frame for the state having the higher durational probability.

Similarly, six of the seven states may have about twenty frames while the remaining state has about forty frames. A signal such as this one would also result in a total of eight assigned frames: one frame for each of seven frames plus one extra frame for the state having the higher durational probability. Both of the previously described exemplary speech signals result in the same set of representative frames after processing by time normalization logic 20.

Time normalization logic 20 will always have a fixed number of representative frames as its output. There will be one representative frame for each state of the state sequence of the likely stochastic model, and a fixed number of additional representative frames based on durational probabilities of the states. This provides a fixed number of inputs for the neural network 22.

In one embodiment, the representative frame for each state has components which are the mean of corresponding components in all of the frames for that state. In another embodiment, the representative frame for each state has components which are the median of corresponding components of all of the frames for that state. Other techniques for determining the components of the representative frames are possible.

It is to be appreciated that first order hidden Markov models are preferred to facilitate training of the models. Alternatively, if desired, higher order hidden Markov models having higher order state transition properties and/or higher order output probability distribution functions may be employed to model the speech signal classes. Further, it is to be appreciated that other stochastic models may be employed in embodiments of the present invention; however, hidden Markov models are preferred in the art of speech recognition.

Figure 3:
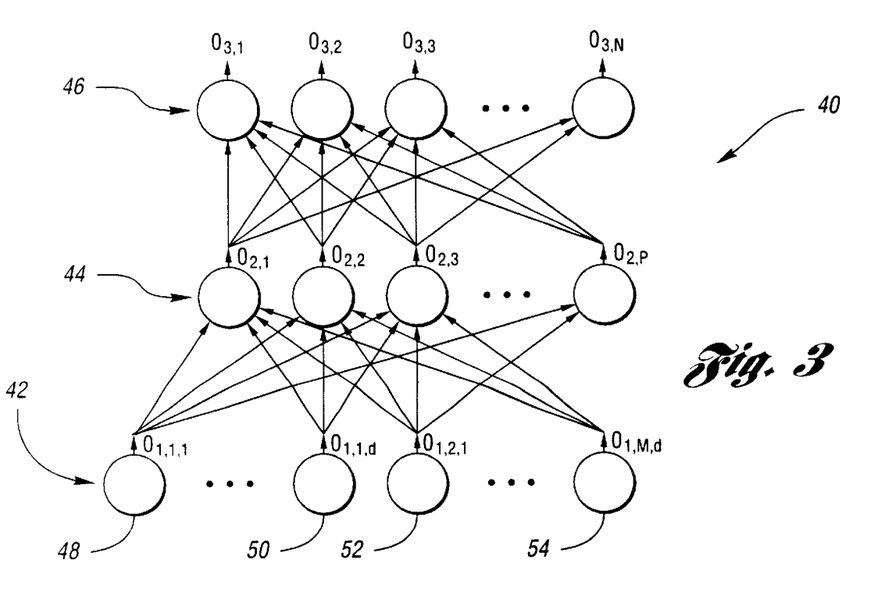
FIG. 3 is a three-layer, feedforward perceptron neural network which is utilized in embodiments of the present invention, and illustrates the use of M speech vectors which each have d dimensions.

With reference to FIG. 3, a preferred embodiment of a neural network for systems and methods of the present invention is generally indicated at 40. The neural network 40 is a three-layer perceptron neural network. Neural network 40 has an input layer 42 which includes a plurality of neurons. Each neuron of the input layer 42 receives a component of a representative frame for the likely stochastic model. As illustrated, neuron 48 receives the first component of the first representative frame. Neuron 50 receives the d-th component of the first representative frame. That is, the representative frames are d dimensional feature vectors extracted by frame logic 12. Neuron 52 receives the first component of the second representative frame; and so on. All of the neurons of the first layer 42 receive frame components in this manner, the d-th component of the M-th representative frame is received by neuron 54.

Neural network 40 has a middle layer 44 including P neurons. Neural network 40 further includes output layer 46 including N neurons. Each of the N neurons corresponds to a speech signal class. The neural network determines the likely speech signal class based on the internal excitations of the neurons in output layer 46.

The learning law for the perceptron 40 is a simple error feedback. The network learns the associations between input and output patterns by being exposed to many lessons. The weights are adjusted until the desired target output is produced. This weight adaptation is referred to as error backpropagation learning law.

In a preferred embodiment, the neural network 40 includes a plurality of neural networks, each neural network of the plurality of neural networks is configured based on a corresponding pair of the stochastic models. Each neural network is trained specifically for interclass distinction between a corresponding pair of the speech signal classes. Alternatively, one neural network may be employed to perform the interclass distinction. However, it is to be appreciated that the use of multiple neural networks simplifies training. It is to be appreciated that other neural network types may be employed in embodiments of the present invention; however, the multi-layered perceptron is preferred.

The processing logic and associated neural network or networks may be implemented via software, firmware, hardware, microcode, or any combination of processing logic and neural network implementation methods known in the art of speech recognition. It is to be appreciated that the processing logic may be configured for optimum serial implementation of the modified Viterbi algorithm, optimum parallel implementation of the modified Viterbi algorithm, or any desired amount of optimization of the two implementations relative to one another.

Figure 4:
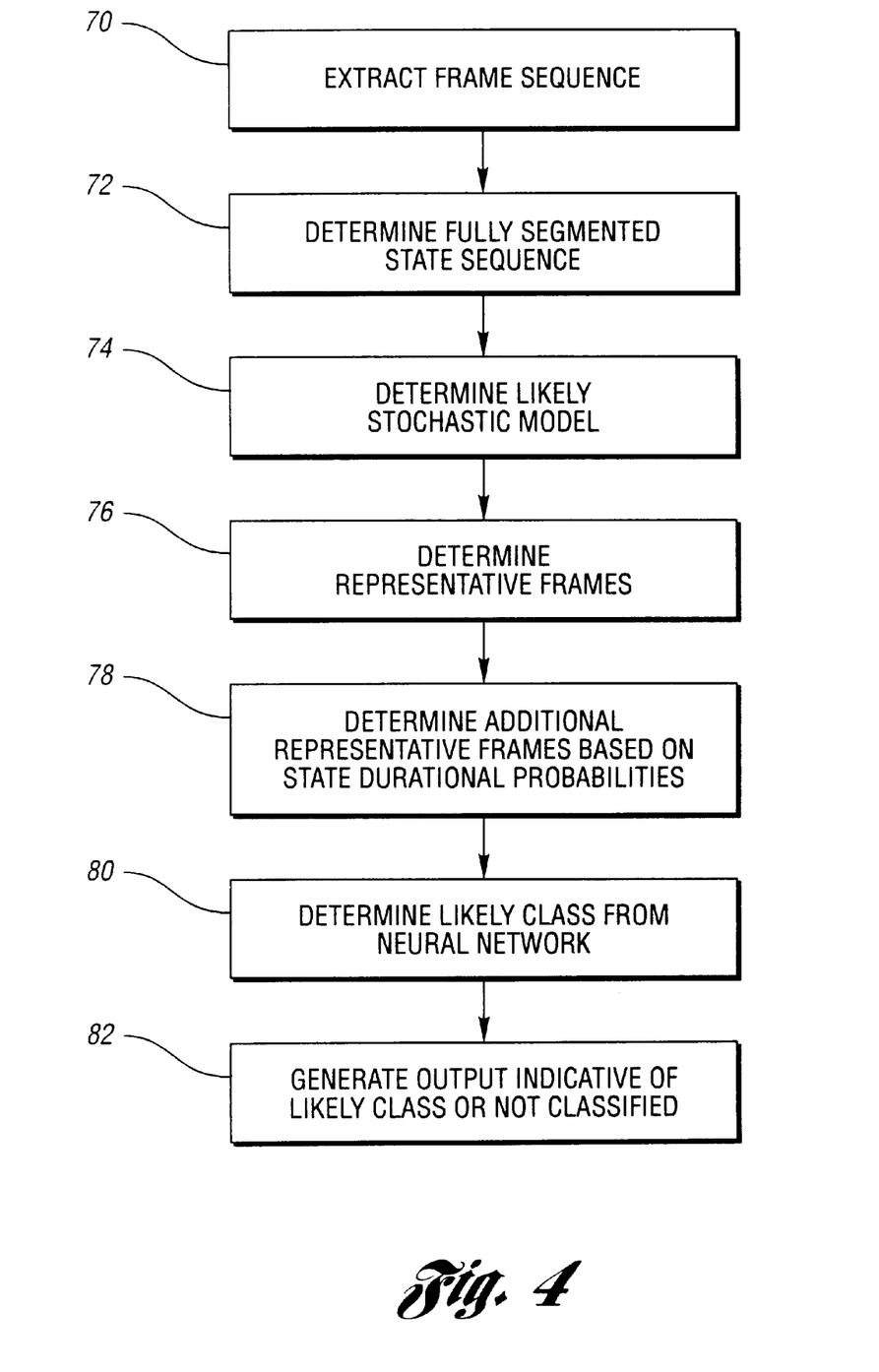
FIG. 4 is a block diagram illustrating a method of the present invention for classifying a speech signal.

Referring to FIG. 4, a method of the present invention for classifying a speech signal will be described. At step 70, a sequence of frames is extracted from a speech exemplar. For each stochastic model, such as hidden Markov models, fully segmented state sequences are determined at step 72. At step 74, the likely stochastic model is determined. Because each stochastic model corresponds to a speech signal class, the likely stochastic model indicates a preliminary likely class.

At step 76, a representative frame is determined for each state of the likely stochastic model. Preferably, additional representative frames are determined to model durational variability among the states as described previously, at step 78.

At step 80, the likely speech signal class is determined from a neural network. In a preferred embodiment, the likely class is determined from a plurality of neural networks as described previously.

All of the neural networks that distinguish the preliminary class from other classes are used to verify the integrity of the stochastic model preclassification. If all of the neural networks agree with the selected stochastic model, then the exemplar is considered "classified," and the likely speech signal class is the same as the preliminary speech signal class. If the neural networks and the stochastic model preclassifier disagree, or the neural networks disagree, the exemplar is considered "not classified," and there is not any likely speech signal class.

Because the preliminary speech signal class may not always be correct, preferred embodiments of the present invention use more than one full state segmentation to select the stochastic model. That is, the best three (or any other number desired) full state segmentations are determined. If the three best full state segmentations are all from the same stochastic model, that stochastic model is selected. Otherwise, a stochastic model having two of the three full state segmentations may be selected. If all three full state segmentations correspond to different stochastic models, the exemplar may be immediately considered "not classified," or more full state segmentations may be obtained.

Alternatively, representative frames from all three (or any other number desired) of the best full state segmentations may be separately introduced to a neural network or several neural networks. If any one of the three full state segmentations corresponds to a stochastic model which agrees with the outputs of the neural network or neural networks, that stochastic model corresponds to the likely speech signal class.

It is to be appreciated that there are numerous ways to combine the results of the stochastic model classifier and neural network classifier to determine the likely speech signal class. The systems and methods of the present invention make it practical to combine the two paradigms to produce accurate speech signal classification by utilizing full state segmentation.

For example, any number of fully state segmentations may be used to determine a plurality of possible stochastic models. For each full state segmentation, representative frames may then be introduced to the neural network or networks. The probabilities for each of the stochastic models corresponding to the fully segmented state sequences, and the outputs of the neural network or networks for each set of representative frames may be used to determine a likely speech signal class in a variety of ways which are appreciated by one of ordinary skill in the art.

At step 82, an output is generated which is indicative of the likely speech signal class or is indicative of a speech signal being not classified. Further, additional outputs may be generated indicative of the degree of class distinction or integrity of classification, as appreciated by one of ordinary skill in the art. These additional outputs may be based on any of numerous combinations of stochastic model classifier and neural network classifier results.

While the best mode for carrying out the invention has been described in detail, those familiar with the art to which this invention relates will recognize various alternative designs and embodiments for practicing the invention as defined by the following claims.

What is claimed is:

1. A method of classifying a speech signal within a likely speech signal class of a plurality of speech signal classes corresponding to a plurality of stochastic models, each stochastic model including a plurality of states having state transition and output probabilities to generate state sequences which model evolutionary characteristics and durational variability of the speech signal, the method comprising:

extracting a frame sequence from the speech signal;

determining a state sequence for each stochastic model, each state sequence corresponding to the frame sequence and having full state segmentation wherein each state corresponds to at least one frame;

determining a likely stochastic model of the plurality of stochastic models based on the state transition and output probabilities associated with the state sequences;

determining representative frames for the state sequence of the likely stochastic model to provide speech signal time normalization; and generating an output signal indicative of the likely speech signal class based on a neural network having a plurality of inputs receiving the representative frames and a plurality of outputs corresponding to the plurality of speech signal classes, and further based on the likely stochastic model.

2. The method of claim 1 wherein the stochastic models are hidden Markov models.

3. The method of claim 2 wherein the hidden Markov models are first order hidden Markov models.

4. The method of claim 3 wherein the hidden Markov models have left-to-right topology.

5. The method of claim 2 wherein determining a state sequence for each stochastic model further comprises:

determining an optimal state sequence corresponding to the frame sequence; and when the optimal state sequence does not have full state segmentation, determining sub-optimal state sequences corresponding to the frame sequence to determine a state sequence corresponding to the frame sequence that has full state segmentation.

6. The method of claim 1 wherein the output probabilities are defined by probability distribution functions.

7. The method of claim 1 wherein determining representative frames further comprises:

determining the representative frame for each state of the state sequence of the likely stochastic model, wherein each component of the representative frame is a mean of corresponding components of the at least one frame for each state.

8. The method of claim 1 wherein determining representative frames further comprises:

determining a representative frame for each state of the state sequence of the likely stochastic model; and determining at least one additional representative frame based on durational probabilities of the states.

9. The method of claim 1 wherein determining a likely stochastic model further comprises:

determining several likely stochastic models, wherein representative frames are determined for each likely stochastic model.

10. The method of claim 1 wherein the neural network further includes a plurality of neural networks, each neural network of the plurality of neural networks being configured based on a corresponding pair of the stochastic models for interclass distinction between a corresponding pair of speech signal classes, and wherein generating an output signal further comprises:

generating an output signal indicative of the likely speech signal class based on outputs of the plurality of neural networks and the likely stochastic model.

11. A system for classifying a speech signal within a likely speech signal class of a plurality of speech signal classes, the system comprising:

stochastic model logic for representing a plurality of stochastic models, each stochastic model including a plurality of states having state transition and output probabilities to generate state sequences which model evolutionary characteristics and durational variability of the speech signal;

frame logic for extracting a frame sequence from the speech signal;

segmentation logic for determining a state sequence for each stochastic model, each state sequence corresponding to the frame sequence and having full state segmentation wherein each state corresponds to at least one frame;

model selection logic for determining a likely stochastic model of the plurality of stochastic models based on the state transition and output probabilities associated with the state sequences;

time normalization logic for determining representative frames for the state sequence of the likely stochastic model to provide speech signal time normalization;

a neural network having a plurality of inputs receiving the representative frames and a plurality of outputs corresponding to the plurality of speech signal classes; and processing logic for generating an output signal indicative of the likely speech signal class based on the neural network outputs, and further based on the likely stochastic model.

12. The system of claim 11 wherein the stochastic models are hidden Markov models.

13. The system of claim 12 wherein the hidden Markov models are first order hidden Markov models.

14. The system of claim 13 wherein the hidden Markov models have left-to-right topology.

15. The system of claim 12 wherein the segmentation logic further comprises:

segmentation logic for determining an optimal state sequence corresponding to the frame sequence, and for determining sub-optimal state sequences corresponding to the frame sequence to determine a state sequence corresponding to the frame sequence that has full state segmentation, when the optimal state sequence does not have full state segmentation.

16. The system of claim 11 wherein the output probabilities are defined by probability distribution functions.

17. The system of claim 11 wherein the time normalization logic further comprises:

time normalization logic for determining the representative frame for each state of the state sequence of the likely stochastic model, wherein each component of the representative frame is a mean of corresponding components of the at least one frame for each state.

18. The system of claim 11 wherein the time normalization logic further comprises:

time normalization logic for determining a representative frame for each state of the state sequence of the likely stochastic model, and for determining at least one additional representative frame based on durational probabilities of the states.

19. The system of claim 11 wherein the model selection logic further comprises:

model selection logic for determining several likely stochastic models, wherein representative frames are determined for each likely stochastic model.

* * * * *